United States Patent

Yamada

[11] 3,923,019
[45] Dec. 2, 1975

[54] TWO-CYCLE ENGINE SYSTEM

[75] Inventor: Seiichiro Yamada, Shizuoka, Japan

[73] Assignee: Yamaha Hatsudoki Kabushiki Kaisha, Iwata, Shizuoka, Japan

[22] Filed: Mar. 18, 1974

[21] Appl. No.: 452,400

[30] Foreign Application Priority Data
Mar. 19, 1973  Japan........................ 48-33635[U]

[52] U.S. Cl........ 123/53 BA; 123/32 ST; 123/53 B; 123/73 R; 123/75 B; 123/DIG. 4
[51] Int. Cl.²......................................... F02B 25/12
[58] Field of Search............ 123/53 B, 53 BA, 52 A, 123/51 BA, 51 BB, 51 BC, 51 BD, DIG. 4, 191 S, 191 SP

[56] References Cited
UNITED STATES PATENTS

| | | | |
|---|---|---|---|
| 1,149,142 | 8/1915 | Hornor | 123/53 B |
| 1,498,757 | 6/1924 | Robertson | 123/53 B |
| 1,660,860 | 2/1928 | Burtnett | 123/53 B |
| 2,063,817 | 12/1936 | Mallory | 123/53 |
| 2,768,616 | 10/1956 | Venediger | 123/51 BD |

FOREIGN PATENTS OR APPLICATIONS

| | | | |
|---|---|---|---|
| 28,514 | 1/1907 | Germany | 123/53 |
| 885,281 | 12/1961 | United Kingdom | 123/53 A |

*Primary Examiner*—Wendell E. Burns
*Assistant Examiner*—David Reynolds
*Attorney, Agent, or Firm*—Spensley, Horn and Lubitz

[57] ABSTRACT

A two-cycle engine system comprising a first engine, a second engine, and a combustion chamber connecting said engines wherein a rich air-fuel mixture is supplied into the combustion chamber having an ignition plug through and by the second engine, and a lean air-fuel mixture (or air) is supplied into the first engine. In the operation of the system, the rich mixture in the combustion chamber will permit a more reliable ignition and quick burning and enables a burning of a lean mixture, while in addition the lean mixture (or air) completely scavenges the burnt gases with an improved pollution performance.

10 Claims, 9 Drawing Figures

BDC — RICH MIXTURE, LEAN MIXTURE, BURNT GAS

EXHAUST & SCAVENGING

EXHAUST & SCAVENGING

COMPRESSION

TDC

COMBUSTION

IGNITION

EXPANSION

TWO-CYCLE ENGINE SYSTEM

BACKGROUND OF THE INVENTION

1. Field of the Invention

This invention relates to a two-cycle engine system, more particularly of the type in which a rich air-fuel mixture circulates into a combustion chamber having an ignition plug by and through a second engine, while a lean air-fuel mixture (or air) is supplied into a first (main) engine.

2. Prior Art

It has been generally known that in an internal combustion engine a rich air-fuel mixture and a lean air-fuel mixture may be supplied into the combustion chamber of the engine from separate sources so that the rich mixture provides a good ignition, propagating flames which ignites the lean mixture with the result that a less amount of unburnt fuel is contained in the exhaust gases.

Prior arts, in the case of four-cycle engines, disclose the torch ignition internal combustion system and modifications thereof having an auxiliary chamber with an ignition plug and a nozzle to inject fuel to form a rich fuel mixture in the auxiliary chamber to avoid igniting failures, whereby the flames of the rich mixture in the auxiliary chamber thus ignited burst into the main combustion chamber and fire the lean fuel mixture therein. The improvements in such prior art substantially exist in the ignition process making use of an auxiliary combustion chamber to enable an efficient torch ignition in the system. Therein a fuel injection nozzle is used to supply the rich fuel mixture and the volume of the auxiliary chamber is small in comparison with the main combustion chamber since the torch mechanism requires little in the way of volume. In fact it can be generally observed that the nozzle to inject the fuel does not guarantee a sufficient effect in the atomization and vaporization of the fuel in the auxiliary chamber, which causes failures at igniting and firing the fuel, and the construction of such a device to supply the fuel is so complicated that it requires a very high precision in the manufacturing and construction process which may lead to possible mechanical difficulties. It should be further noted that in the case of two-cycle engine, the burnt gases must be scavenged with the following fuel mixture supplied, and the unburnt fuel may blow by through the exhaust port together with the burnt gases in order to obtain a sufficient scavenge performance. Thus, the prior art cannot be applied to a two-cycle engine.

Another prior art as to a two-cycle engine teaches that an ignition chamber with a spheroidal structure and a passage to supply a richer mixture into the ignition chamber may advantageously be employed to attain an improved ignition and combustion by inducing a toroidal flow of the rich mixture in the chamber. In accordance with this system, a certain extra time elapses in the combustion stroke because of the facts that the ignition process is effected in the toroidal flow of the rich mixture prior to the main combustion and that the majority of the fuel in the combustion chamber is the lean mixture which gives a relatively less burning velocity. Accordingly, there remain some drawbacks unsolved such as the reduction of the thermal efficiency and of the number of revolutions causing less power and overheating.

The present invention solves those problems which the devices disclosed by the prior arts have failed to resolve. The employment of a second engine and a combustion chamber has minimized all the drawbacks described above.

SUMMARY OF THE INVENTION

It is an object of this invention to provide a two-cycle engine system which guarantees a secure ignition and combustion.

It is another object of this invention to provide a two-cycle engine system which restricts the amount of harmful components in the exhaust gases at the lowest.

It is still another object of this invention to provide a two-cycle engine with an improved operation efficiency which is comparatively simple in construction.

The novel features which are believed to be characteristic of the invention, both as to its construction and operation, together with further objects and advantages thereof, will be better understood from the following description considered in connection with the accompanying drawings in which a presently preferred embodiment of the invention illustrated by way of example. It is to be expressly understood, however, that the drawings are for the purpose of illustration and description only and are not intended as a definition of the limits of the invention.

DESCRIPTION OF THE PRESENTLY PREFERRED EMBODIMENT

Figure 1:
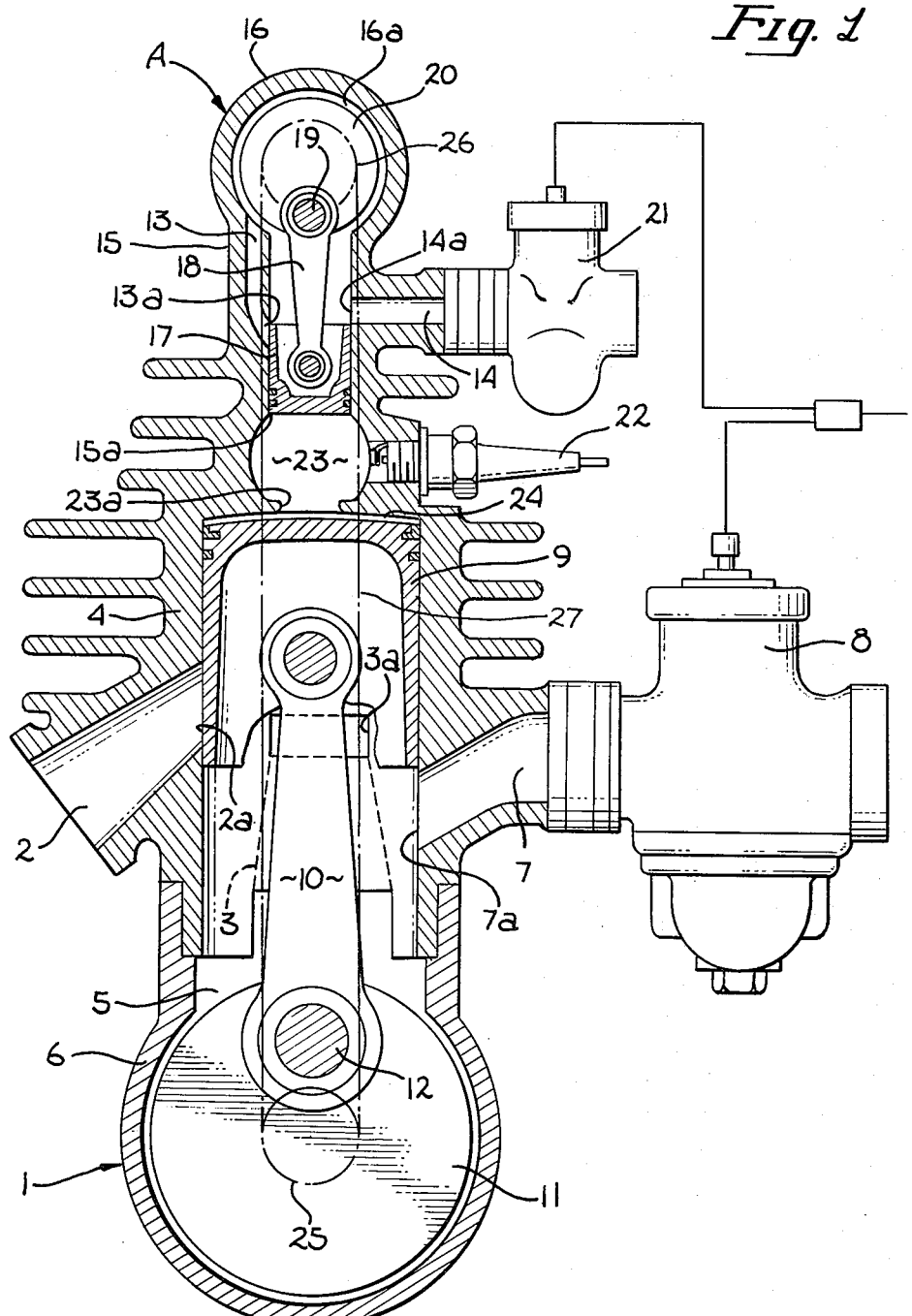
FIG. 1 shows a vertical cross-sectional view of the form of this invention.

An understanding of this invention can be best gained by reference to FIG. 1. The engine system shown in FIG. 1 has a first two-cycle engine 1 that includes a first cylinder 4 in which an exhaust port 2a and a pair of scavenging ports, only one of which is shown in FIG. 1, are provided in the wall thereof. Under the first cylinder 4 is placed a first crankcase 6 which includes a first crank chamber 5. A first carburetor 8, which is set to supply a lean air-fuel mixture through intake passage 7, is connected with an intake port 7a furnished in said crank member 5. The intake passage 7 can be so modified that the intake port 7a is opened to the atmosphere through the intake passage with a throttle valve to control the amount of air that enters via said passage. A piston 9 is mounted to reciprocate inside said cylinder 4, and is incorporated with a crank pin 12 of a first crankshaft 11 by means of a first connecting rod 10. A pair of scavenging ports 3a are communicated with said crank chamber 5 through a pair of scavenging passages 3.

A second two-cycle engine A is provided at the top of the first engine 1. Said second engine A comprises a second cylinder 15 having a second scavenging port 13a and a second intake port 14a, a second crankcase 16 forming a second crank chamber 16a at the top of said cylinder 15, and a second piston 17 reciprocating inside said cylinder 15. The second piston 17 is connected with a second crank pin 19 of a second crankshaft 20 by means of a second connecting rod 18. A second scavenging port 13a is communicated with the crank chamber 16a through a second scavenging passage 13. A second intake port 14a provided in said second crank chamber 16a is connected with a second carburetor 21, which is set to supply a rich air-fuel mixture through a second intake passage 14. A fuel injection device may be used instead of the carburetor to inject fuel into an intake pipe or crank chamber. The throttle opening of the second carburetor 21 is so interconnected to that of the first carburetor 8, that the former becomes larger as the latter becomes larger. An outer end 15a of the second cylinder 15 of the second engine A is communicated with the upper part 24 of the first cylinder 4 of the engine 1 through a combustion chamber 23 which is directly connected with said upper part 24 of the first cylinder 4 of the engine 1 through a throttled (or constricted) passage 23a, which is relatively wide and short, while the second cylinder room 15a directly opens to said combustion chamber 23 on the opposite side without any construction.

The second crankshaft 20 of the second engine A and the first crankshaft 11 of the engine 1 are interconnected by a drive means such as a toothed timing belt 27 and toothed timing pulleys 25 and 26 which enables the first piston 9 and the second piston 17 to reciprocate with approximately the same timing. Thus, the opening and closing of scavenging ports 3a and 13a are set for approximately the same timing (e.g., approximately in the same phase). In some circumstances a better result may be obtained by slightly retarding the timing of the opening of the scavenging port 13a of the second engine with respect to the opening of the scavenging port 3a of the first engine 1. This tends to prevent the rich fresh mixture supplied through the second scavenging port 13a from flowing out through the exhaust port 2a with the lean mixture or air supplied through the first scavenging port 3a. However, the timing of opening said second scavenging port 13a can also be set to be simultaneous or a little earlier than the opening of the scavenging port 3a of the first engine. The selected timing of such opening can be accomplished by arranging the shape of the combustion chamber 23, particularly the shape of the throttled passage 23a, or otherwise by arranging the distance between the scavenging port 13a and the throttled passage 23a. A fresh mixture can be supplied more effectively into the combustion chamber 23 from the second engine A, with the desirable result of eliminating the back-flow of the fresh mixture, by setting the timing of closing of the scavening port 13a to be simultaneous with or a little earlier than that of closing of the scavenging port 3a. However, by arranging the shape of the combustion chamber 23, or the distance between the scavenging port 13a and the throttled passage 23a, the above closing timing can be simultaneous with or a little later than that of the scavenging port 3a.

With the above structure in mind, an explanation of the operation of this invention will follow with respect to FIG. 1 and particularly FIG. 4 A–E. After combustion the first piston 9 moves down from the top dead center (towards the bottom dead center), and the second piston 17 moves towards the bottom dead center (in FIG. 1, the bottom dead center of the second piston appears at an uppermost part of the cylinder 15) (FIG. 4 D and E). The burnt gases inside the upper part 24 of the first cylinder room is scavenged through the exhaust passage 2, when the exhaust port 2a is opened by the movement of the piston 9. When pistons 9 and 17 move further to the bottom dead center to open the scavenging ports 3a and 13a and the lean and rich mixtures precompressed in the crankcases 5 and 16 are supplied into the rooms of the cylinders 4 and 15. The rich mixture supplied from the scavenging port 13a scavenges the burnt gases in the combustion chamber 23 to the upper part 24 of the first cylinder and the lean mixture or air supplied from the scavenging port 3a scavenges the upper part 24 of the first cylinder (FIG. 4 A and B). Thus, the burnt gases are scavenged out of the first cylinder and combustion chamber through the exhaust passage 2. After the bottom dead center, the pistons 9 and 17 begin to move toward T.D.C. and will first close the scavenging ports 3a and 13a. Then, immediately before the exhaust port 2a is closed, the rich mixture supplied through the scavenging port 13a scavenges the burnt gases in the combustion chamber with the majority of the rich mixture remaining in said chamber for the next combustion when the exhaust port 2 closes, as the volume of the combustion chamber and the distance between the scavenging port 13a and the throttled passage 23a are comparatively large enough to maintain the rich mixture in the combustion chamber. Meanwhile the lean mixture or air supplied through the scavenging port 3a scavenges the burnt gases in the upper part 24 of the first cylinder out through the exhaust passage 2 with the result that a small portion of the lean mixture or air is unavoidably expelled with the burnt gases. The remainder, which is the majority, of the lean fuel remains in the upper part 24 of the first cylinder for the next combustion. From this point of view, regarding the volume of the combustion chamber, the preferred ratio of the volume of combustion chamber ($X_1$) to the total of the volume of the combustion chamber ($X_1$) and the volume of the upper part 24 of the first cylinder ($X_2$) when the first piston 9 being at T.D.C. is given to meet the range of:

$$\frac{X_1}{X_1 + X_2} = 0.4 - 0.85$$

and most preferably the range of:

$$\frac{X_1}{X_1 + X_2} = 0.65 - 0.75$$

Further in this connection, it can be generally said that the throttled passage 23a provided between the combustion chamber 23 and the upper part 24 of the first cylinder is preferable to keep the rich fuel in the combustion chamber. The particularly preferred ratio of the cross-sectional area of the throttled passage ($Y_1$) to that of the widest part of the combustion chamber ($Y_2$) meets the range of:

$$\frac{Y_1}{Y_2} = 0.2 - 0.5,$$

and more preferably the range of:

$$\frac{Y_1}{Y_2} = 0.3 - 0.4.$$

$Y_2$-continued

Figure 5:
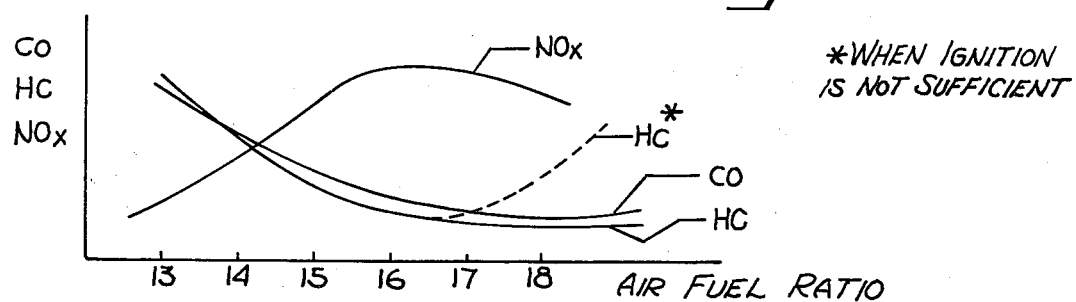
FIG. 5 shows the relationship between the air-fuel ratio and the amount of the harmful components in the exhaust gases.
Figure 4A:
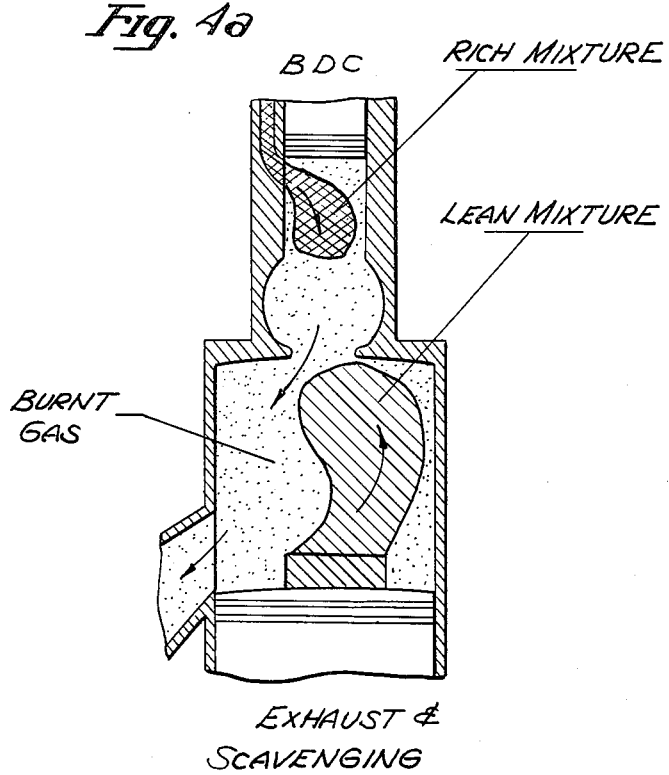
FIG. 4 illustrates stages of the operation of this invention in a simplified form.
Figure 4B:
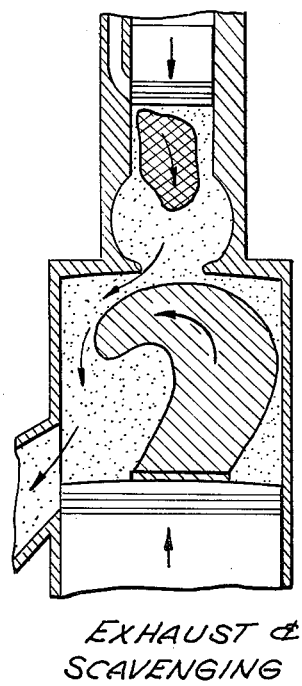
Figure 4C:
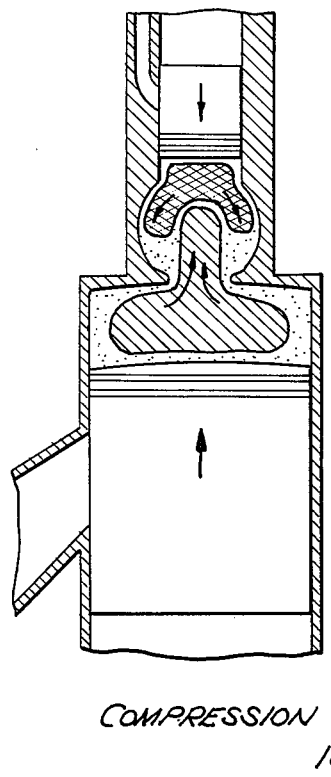
Figure 4D:
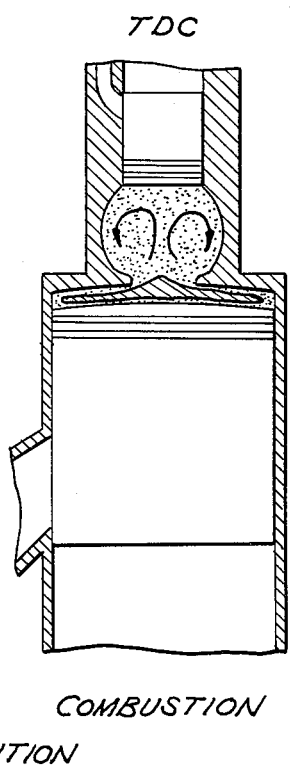
Figure 4E:
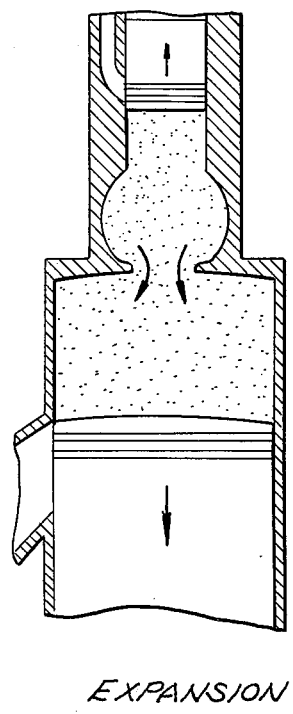

It has been observed that when the ratio of $Y_1 / Y_2$ is too small, the amount of unburnt fuel in the exhaust gases becomes less, while the power decreases, and when it is too large the contrary will occur. Still in the above connection, it should be noted that the optimum air-fuel ratio in the rich mixture stands approximately 13–14 to obtain a good ignition; however, this ratio does not always promise a good combustion with the least amount of Co and HC. For example, in the case of the ratio of $$\frac{X_1}{X_1 + X_2}$$

being 0.75, the mean air-fuel ratio of 14 in the combustion chamber at the T.D.C. means the air-fuel ratio of 18.7 (= 14/0.75) in the upper part of the first cylinder near the end of the expansion stroke, if only the air is supplied in the first cylinder. Although this ratio may likely allow a good combustion with a reduced amount of Co and HC in the exhaust emissions as shown in FIG. 5, it is observed that the amount of HC is directly dependent upon the ignition. To maintain good combustion with less HC, the combustion chamber of this invention provides sufficient area for the rich fuel to make a swirl of stratified mixture, with centrifugal force causing the richer mixture to flow close to the wall having the electrode of the ignition plug and to make the ignition easier. Thus, the combustion chamber may preferably be spherically shaped to make an efficient stratified swirl therein. Furthermore, to make the swirl more effective, it is within the scope of the invention to mount a fuel supply port around the axis of the swirl falling at right angles to the swirl in the combustion chamber so that the mixing with the air and the atomization of the fuel are improved (FIG. 4C).

Returning to the operation of the system, as the pistons 9 and 17 move further up to the top dead center, a comparatively rich mixture remains in the combustion chamber 23 and a lean mixture in the upper part 24 of the first cylinder and both mixtures are compressed. When both the pistons 9 and 17 move toward the top dead center beyond a given position, the intake ports 7a and 14a are opened, resulting in a swift flow of the respective lean and rich mixtures into both the crankcases 5 and 16 in which a negative pressure has been provided. As mentioned above, when the pistons 9 and 17 move up to approximately 20° before the top dead center with a rich and lean mixtures developing, the ignition plug 22 at the optimum position inside the combustion chamber 23 discharges (i.e., sparks), thus igniting the stratified air-fuel mixture inside said combustion chamber 23 without failure. The flames thus ignited spread quickly inside of the combustion chamber 23 with the aid of the swirl in the combustion chamber to form burning gases. The burning gas can flow, from the combustion chamber 23, quickly and nearly unhindered through the relatively wide and short passage 23a to the upper part 24 of the first cylinder to exert a pressure on the head of the piston 9. The burning gases can be mixed with a remaining lean mixture (or air) in the upper part 24 and burn perfectly.

Figure 2:
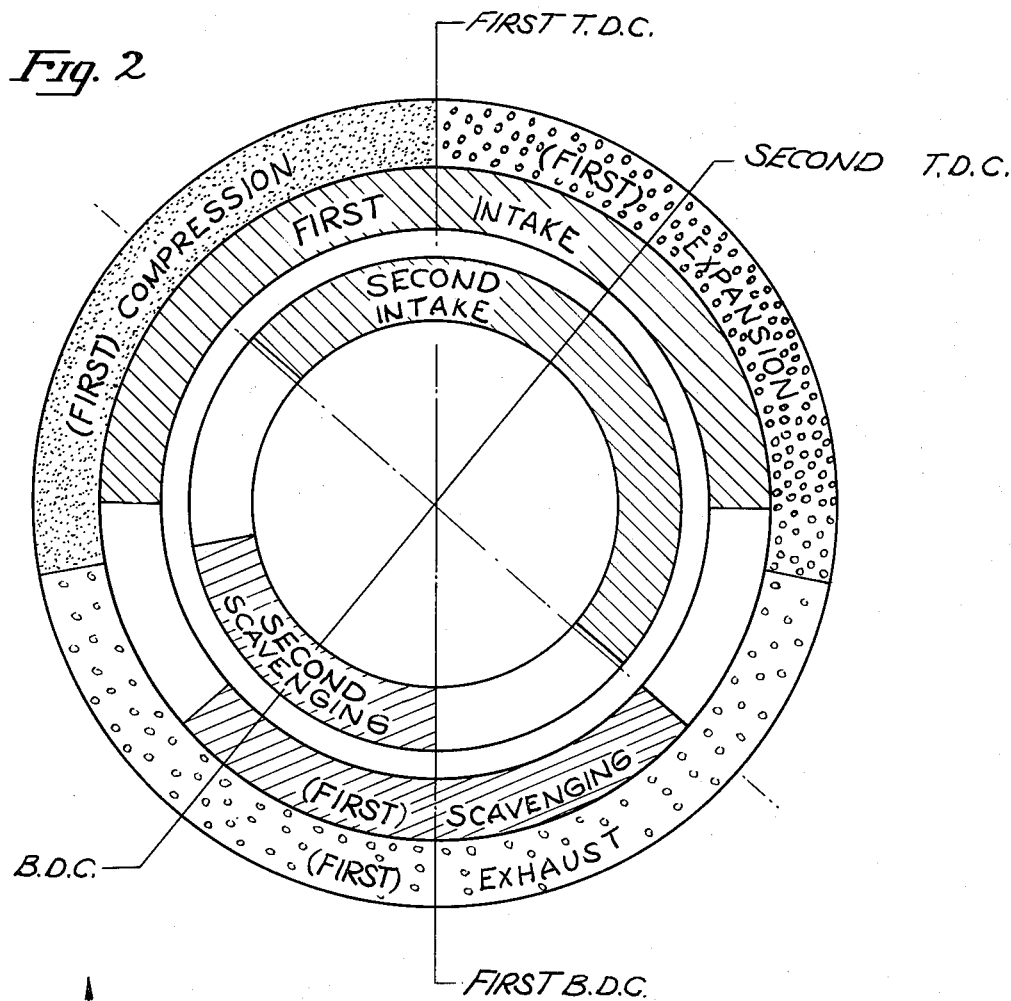
FIG. 2 shows the operation of this invention schematically.

Now FIG. 2 schematically shows the operation of the engine in which the phase of the second engine A is retarded approximately 40° behind the first engine 1 in FIG. 1. The operations of the combustion chamber and the upper part 24 of the first cylinder room, the first crankcase, and the second crankcase are shown respectively by the outermost, middle, and innermost regions.

Figure 3:
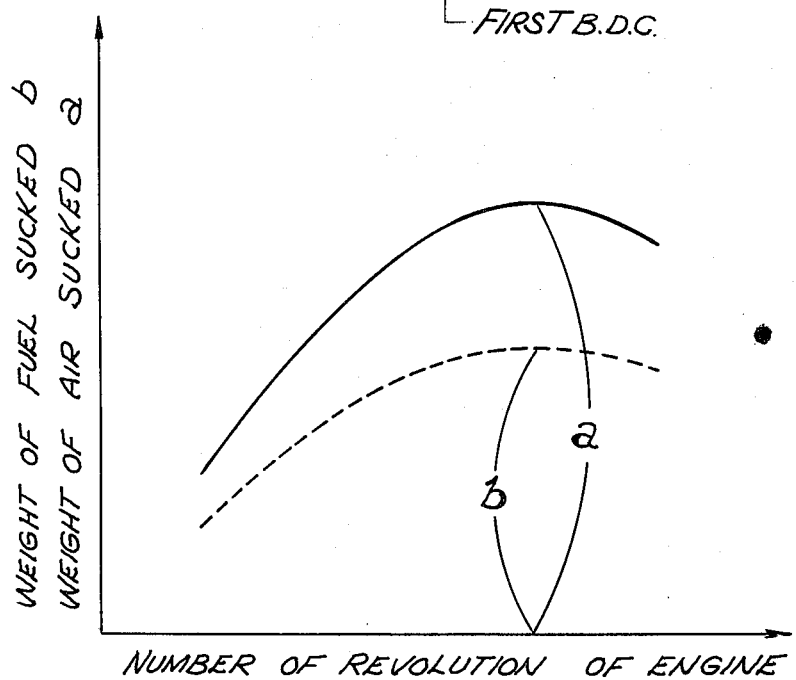
FIG. 3 is a graph showing a relationship between the number of revolutions and the amount of the fuel and air supplied.

FIG. 3 shows the relationship between the intake air weight per unit time (a) and the intake fuel weight per unit time (b) and the engine revolutions, where it is assumed that the opening of the throttle valves of the carburetors are maintained constant. It may be noted that the ratio of air and fuel to be supplied into the two-cycle engine system (air-fuel ratio) can be kept almost constant regardless of engine revolutions because rich and lean mixtures are supplied by both engines which are of the crankcase precompression pump type.

As explained in the foregoing, this invention is capable of an improved fuel consumption and at the same time an effective discharge of burnt gases out of the combustion area by employing two of two-cycle engines connected by means of a combustion chamber having an ignition plug therein. In this arrangement one engine sucks a lean mixture (or air) and the other, a rich mixture, and after the mixture is ignited and burnt in the combustion chamber and further burnt in the upper part 24 of the cylinder 9 mixed with the lean mixture (or air) remaining therein, the burnt gases are scavenged by a scavenging flow composed of a lean mixture or air sucked in by the engine 1 abovementioned, thus preventing the unburnt fuel from being exhausted. Furthermore, the fuel in the rich mixture to be supplied into the combustion chamber is fully atomized and vaporized in its long travel to the combustion chamber, that is, after the fuel is vaporized into the air by the carburetor or fuel injection device, it is further mixed with air and heated in the second crankcase to be supplied into the above combustion chamber through the second scavenging passage. Therefore, the rich mixture supplied into the combustion chamber can be fired without fail and develops strong burning gases, which further burns perfectly inside the upper part of the cylinder mixed with a lean mixture (or air) diluted with a considerable amount of air. Accordingly, very little harmful components can be found in the exhaust fumes. In this way, it becomes possible to make a clean engine. A further advantage of this invention involving the crankcase precompression pump type of engine is an accurate and secure supply, timing and amount of fuel (air-fuel mixture), as well as a simpler construction which does not require a high precision in the manufacturing process as compared with the type in which the fuel is directly injected through a nozzle into the combustion chamber.

As many apparently widely different embodiments of this invention may be made without departing from the spirit and scope thereof, it is to be understood that the invention is not limited to the specific embodiments thereof except as defined in the appended claims.

I claim:

1. A stratified charge, two cycle internal combustion engine assembly having a first and second two cycle engine, each of said two cycle engines having a cylinder, a closed crankcase at one end of said cylinder, a crankshaft rotatably mounted in said crankcase, a piston coupled to said crankshaft for reciprocation along the longitudinal axis of said corresponding cylinder, an inlet port means for admitting an air-fuel mixture into said crankcase when said piston is at a position with said cylinder distal from said crankcase, and a delivery port means controlled by said corresponding piston for delivering said corresponding air-fuel mixture from said corresponding crankcase to each corresponding cylinder when said corresponding piston is disposed in the portion of said corresponding cylinder adjacent to said crankcase, the improvement comprising:

- a closed common combustion chamber formed at the ends of said first and second cylinders distal from said first and second crankcases, said common combustion chamber formed to centrifugally segregate said air-fuel mixtures delivered to said common combustion chamber from said first and second two cycle engines;
- an ignition means for igniting said air-fuel mixtures delivered to said common combustion chamber to produce an exhaust gas;
- an exhaust port means opening within said cylinder of said first two cycle engine for exhausting said exhaust gas from said common combustion chamber and from said cylinder of said first two cycle engine;
- wherein said second two cycle engine is adjusted to deliver a fuel rich air-fuel mixture, and said first two cycle engine is adjusted to deliver a fuel lean air-fuel to said common combustion chamber and to a portion of said cylinder of said first two cycle engine wherein said fuel rich and fuel lean air-fuel mixtures are thoroughly combusted and said exhaust gas is substantially free of combustible gas and partially combusted gas.

2. The stratified charge, two cycle internal combustion engine assembly of claim 1 wherein:

said cylinders of said first and second two cycle engines are aligned along a common longitudinal axis and are oppositely disposed so as to couple each end of said cylinder distal from said crankcase to substantially opposed portions of said common combustion chamber.

3. The stratified charge, two cycle internal combustion engine assembly of claim 1 wherein:

said piston of said second two cycle engine is cooperatively coupled to said piston of said first two cycle engine so that said pistons move toward said common combustion chamber at approximately the same time.

4. The stratified charge, two cycle internal combustion engine assembly of claim 1 further comprising:

a restriction means at one end of said common combustion chamber for restricting the amount of flow of said fuel rich air-fuel mixture delivered to said common combustion chamber by said second two cycle engine into said cylinder of said first two cycle engine.

5. The stratified, two cycle internal combustion engine assembly of claim 1 wherein:

said common combustion chamber has a generally spherical internal surface to permit segregation of said fuel lean air-fuel mixture delivered to said common combustion chamber by said second two cycle engine from said fuel rich air-fuel mixture delivered to said common combustion chamber by said second two cycle engine before ignition of said fuel lean and fuel rich air-fuel mixtures.

6. A stratified charge, two cycle internal combustion engine assembly having a first and second two cycle engine, each of said two cycle engines having a cylinder, a closed crankcase at one end of said cylinder, a crankshaft rotatably mounted in crankcase, a piston coupled to said crankshaft for reciprocation along the longitudinal axis of said cylinder, an inlet port means for admitting an air-fuel mixture into said crankcase when said piston is at a position within said cylinder distal from said crankcase, and a delivery port means controlled by said corresponding piston for delivering said corresponding air-fuel mixture from said corresponding crankcase to each corresponding cylinder when said corresponding piston is disposed in the portion of said corresponding cylinder nearest said crankcase, the improvement comprising:

- a closed common combustion chamber formed at the end of said first and second cylinders distal from said first and second crankcases, said common combustion chamber having a generally spherical surface to centrifugally segregate a fuel rich air-fuel mixture delivered to said common combustion chamber from said second two cycle engine from a fuel lean air-fuel mixture delivered to said common combustion chamber from said first two cycle engine before ignition of said fuel rich and fuel lean air-fuel mixtures, said cylinders of said first and second two cycle engines being aligned along a common longitudinal axis and oppositely disposed so as to couple each end of said cylinder distal from said crankcase to substantially opposite portions of said common combustion chamber;
- a restriction means at one end of said common combustion chamber for restricting the amount of flow of said fuel lean air-fuel mixture delivered to said common combustion chamber by said second two cycle engine into said cylinder of said first two cycle engine;
- an ignition means for igniting said fuel rich air-fuel mixture delivered to said common combustion chamber to produce an exhaust gas;
- an exhaust port means communicating with said cylinder of said first two cycle engine for exhausting said exhaust gas from said common combustion chamber and from said cylinder of said first two cycle engine.

7. A stratified charge, two cycle internal combustion engine assembly of claim 6 wherein:

the ratio of the volume of the common combustion chamber ($X_1$) to the sum of the volumes of said common combustion chamber ($X_1$), and the volume of the upper portion of the cylinder ($X_2$) of the first two cycle engine, when the corresponding piston of the first two cycle engine is at top dead center, is in the range of 0.40 to 0.85.

8. The stratified two cycle internal combustion engine assembly of claim 7 wherein said ratio of ($X_1$) to the sum of ($X_1$) and ($X_2$) is in the range of 0.65 to 0.75.

9. The stratified, two cycle internal combustion engine assembly of claim 6 wherein the ratio of the minimum cross sectional area ($Y_1$) of the restriction means to the maximum cross sectional area ($Y_2$) of the common combustion chamber is in the range of 0.2 to 0.5.

10. The stratified, two cycle internal combustion engine assembly of claim 9 wherein said ratio of ($Y_1$) to ($Y_2$) is in the range of 0.3 to 0.4.

* * * * *